United States Patent
Bales et al.

(10) Patent No.: US 10,328,489 B1
(45) Date of Patent: *Jun. 25, 2019

(54) DYNAMIC BONDING OF POWDER METALLURGY MATERIALS

(71) Applicant: UNITED TECHNOLOGIES CORPORATION, Hartford, CT (US)

(72) Inventors: Daniel A Bales, Avon, CT (US); Thomas J Watson, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 690 days.

This patent is subject to a terminal disclaimer.

(21) Appl. No.: 14/982,392

(22) Filed: Dec. 29, 2015

(51) Int. Cl.
*B22F 3/00* (2006.01)
*B22F 3/04* (2006.01)
(Continued)

(52) U.S. Cl.
CPC ............. *B22F 3/04* (2013.01); *B22F 1/0003* (2013.01); *B22F 3/08* (2013.01); *B32B 1/02* (2013.01);
(Continued)

(58) Field of Classification Search
CPC .................................. B22F 3/04; B22F 3/08
(Continued)

(56) References Cited

U.S. PATENT DOCUMENTS

| 3,220,103 A | 11/1965 | Simons |
| 3,383,208 A | 5/1968 | Corral |

(Continued)

FOREIGN PATENT DOCUMENTS

| EP | 2022987 A1 | 2/2009 |
| GB | 907629 A | 10/1962 |

(Continued)

OTHER PUBLICATIONS

Clyens S et al: "The dynamic compaction of powdered materials", Materials Science Engineering, Elsevier Sequoia, Lausanne, CH, vol. 30, No. 2, Oct. 1, 1977, pp. 121-139, XP024087544, ISSN: 025-5416, DOI: 10.1016/0025-5416(77)90219-1.

(Continued)

*Primary Examiner* — Mark A Chapman
(74) *Attorney, Agent, or Firm* — Bachman & LaPointe, P.C.

(57) ABSTRACT

A dynamic compaction process comprises forming first and second preforms. Forming each preform includes utilizing a container having an interior and an exterior. Filling the interior of the container with a powder material; sealing the container; subjecting the exterior of the container to an instantaneous dynamic compaction, forming a solid powder metallurgy preform encased by the container. The container gets removed from each preform. The process includes inserting the first and second preforms in another container in a predefined pattern; the predefined pattern aligns the first and second preforms creating an interface. The process includes inserting a backstop against the predefined pattern in this container; subjecting the exterior of this container to an instantaneous dynamic compaction. The process includes bonding the first preform and second preform along the interface to form a component precursor; and removing the container from the precursor. Another step includes processing the precursor into components.

8 Claims, 4 Drawing Sheets

(51) Int. Cl.
*B22F 1/00* (2006.01)
*B32B 1/02* (2006.01)
*B32B 15/01* (2006.01)
*B32B 5/16* (2006.01)
*B22F 3/08* (2006.01)

(52) U.S. Cl.
CPC ............... *B32B 5/16* (2013.01); *B32B 15/01* (2013.01); *B22F 2301/15* (2013.01); *B22F 2301/205* (2013.01); *B32B 2250/03* (2013.01); *B32B 2250/40* (2013.01); *B32B 2264/105* (2013.01); *B32B 2439/00* (2013.01)

(58) Field of Classification Search
USPC .......................................................... 419/68
See application file for complete search history.

(56) References Cited

U.S. PATENT DOCUMENTS

| | | | |
|---|---|---|---|
| 3,408,432 | A | 10/1968 | Tumm et al. |
| 3,608,014 | A | 9/1971 | Balchan et al. |
| 3,732,031 | A | 5/1973 | Bowling et al. |
| 3,934,836 | A | 1/1976 | Dunlap et al. |
| 4,116,149 | A | 9/1978 | Kauf et al. |
| 4,193,529 | A | 3/1980 | Dick et al. |
| 4,772,450 | A | 9/1988 | Friedman |
| 5,100,050 | A | 3/1992 | Krueger et al. |
| 5,161,950 | A | 11/1992 | Krueger et al. |
| 5,549,731 | A | 8/1996 | Cline et al. |
| 6,071,357 | A | 6/2000 | Guruswamy et al. |
| 8,234,788 | B2 | 8/2012 | Rozario et al. |
| 8,281,976 | B2 | 10/2012 | Caizza et al. |
| 8,999,230 | B1 | 4/2015 | Nagarathnam et al. |
| 2006/0078455 | A1 | 4/2006 | Troitski et al. |
| 2008/0159813 | A1 | 7/2008 | Wissmann et al. |
| 2009/0317653 | A1 | 12/2009 | Wakade et al. |
| 2010/0083498 | A1 | 4/2010 | Wakade et al. |
| 2014/0093384 | A1 | 4/2014 | Mironets et al. |
| 2015/0360422 | A1 | 12/2015 | Nemir et al. |
| 2017/0016704 | A1 | 1/2017 | McGuire et al. |

FOREIGN PATENT DOCUMENTS

| | | |
|---|---|---|
| GB | 2228217 A | 8/1990 |
| WO | 02/04153 A1 | 1/2002 |
| WO | 03/061868 A1 | 7/2003 |

OTHER PUBLICATIONS

European Search Report for EP 16206426.5, dated Apr. 25, 2017.
R. Prümmer: "Chapter 10—Powder Compaction", In: "Explosive Welding, Forming and Compaction", Apr. 27, 2012, Applied Science Publishers, XP055366027, ISBN: 978-94-011-9751-9, pp. 369-395, DOI: 10.1007/978-94-011-9751-9.
European Search Report for EP 16206050.3, dated Apr. 21, 2017.
T Z Blazynski: "Chapter 8—Welding of tubular, rod and special assemblies", In: "Explosive Welding, Forming and Compaction", Jan. 1, 1983, Applied Science Publishers, XP055368793, ISBN: 978-94-011-9751-9, pp. 289-345, DOI: 10.1007/978-94-011-9751-9.
European Search Report for EP 16206377.0, dated May 8, 2017.
M. D. Chadwick et al: "Chapter 7—Explosive welding in planar geometries", In: Explosive Welding, Forming and Compaction, Jan. 1, 1983, Applied Science Publishers, XP055369027, ISBN: 978-94-011-9751-9, pp. 219-287, DOI: 10.1007/978-94-011-9751-9.
European Search Report for EP 16206170.9, dated May 4, 2017.
U.S. Office Action dated Aug. 9, 2018 for U.S. Appl. No. 14/982,554.
European Office Action dated Jun. 21, 2018 for European Patent Application No. 16206050.3.
European Office action dated Nov. 9, 2018 issued for corresponding European Patent Application No. 16206426.5.
G. Sethi et al.: "An overview of dynamic compaction in powder metallurgy". International Materials Reviews, vol. 53, No. 4, Jul. 1, 2008, pp. 219-234, XP055514575, US . ISSN: 0950-6608, DOI: 10.1179/174328008X309690.
European Office action dated Oct. 17, 2018 issued for corresponding European Patent Application No. 16206170.9.
European Office action dated Oct. 17, 2018 issued for corresponding European Patent Application No. 16206377.0.
U.S. Office action dated Nov. 9, 2018 in corresponding U.S. Appl. No. 14/982,450.
U.S. Office action dated Jan. 8, 2019 issued for corresponding U.S. Appl. No. 14/982,627.
U.S. Final Office action dated Dec. 14, 2018 issued for corresponding U.S. Appl. No. 14/982,554.

DYNAMIC BONDING OF POWDER METALLURGY MATERIALS

BACKGROUND

The present disclosure is directed to the improved process of dynamic bonding to create hybrid powder metallurgy parts.

Advanced aerospace designs continue to challenge materials and materials technology. While powder metallurgy materials offer unique advantages for many aerospace components, they could be further optimized if dissimilar materials could be bonded into a single component.

For example, in gas turbine engines, disks which support turbine blades rotate at high speeds in an elevated temperature environment. The separate portions of the disks are exposed to different operating conditions and temperatures. Thus, different combinations of mechanical properties are required at different locations. The high temperature rim portion has fatigue crack growth resistance and creep resistance, while the highly stressed hub portion has high burst strength at relatively moderate temperatures and fatigue crack growth resistance. The hub portion also has high resistance to low cycle fatigue for long component life.

Because of these differing requirements for the mechanical properties of the separate disk portions, and the extreme temperature gradients along the radius of a turbine disk, a single alloy is not well suited to satisfy the requirements of both the hub and the rim area of a modern turbine disk.

A possible solution is to use a dual alloy disk with different alloys used in the different portions of the disk, depending upon the properties desired. The disk has a joint region in which the different alloys are joined together to form an integral article.

Numerous techniques for fabricating dual alloy disks have been considered, such as fusion welding, inertia welding, diffusion bonding, bi-casting, and hot isostatic pressing which may be employed to consolidate powder used for one portion of a disk, such as the hub, and also to join it to the other portion. Many of these processes have drawbacks, for example, the disadvantage of hot isostatic pressing is that any impurities present at the joint prior to hot isostatic pressing will remain, and may be exacerbated by the lengthy time at elevated temperature and pressure.

Present powder-metallurgical techniques require three to four steps to produce a finished product. For example, producing tungsten requires pressing and pre-sintering, followed by a consolidation sinter and/or several hot-working steps. Dynamic bonding eliminates the need for large presses and expensive hot-pressing dies. In many instances, actual production time and costs may be reduced.

SUMMARY

In accordance with the present disclosure, there is provided a dynamic compaction process comprises forming a first preform. Forming the preform comprises providing a first container, the first container having an interior and an exterior; filling the interior of the first container with a first powder material; sealing the first container; subjecting the exterior of the first container to an instantaneous dynamic compaction, wherein the instantaneous dynamic compaction applies pressure to the exterior of the first container resulting in the first container collapsing upon the first powder material; forming a solid powder metallurgy preform encased by the first container; and removing the first container from the solid powder metallurgy preform. The dynamic compaction process also includes forming a second preform from a second powder material by another dynamic compaction. The process includes aligning the first preform and the second preform into a predefined pattern in a second container, the second container comprises an interior and an exterior defined by a wall, wherein the predefined pattern comprises an interface; placing at least one backstop in the interior of second container adjacent to the first preform and the second preform, wherein the predefined pattern of first preform and second preform is located between the backstop and the wall of the second container; sealing the second container; subjecting the exterior of the second container to an instantaneous dynamic compaction, wherein the instantaneous dynamic compaction applies pressure to the exterior of the second container resulting in the second container collapsing upon the predefined pattern; bonding the first preform to the second preform along the interface; removing the second container from the predefined pattern; and forming a component precursor.

In an exemplary embodiment the interface comprises a first boundary portion of the first preform having a common boundary with a second boundary portion of the second preform.

In an exemplary embodiment the interface is configured to provide at least one of a larger surface area of contact for bonding, a shear component in loading, and facilitate sonic inspection of the bond interface both radially and axially.

In an exemplary embodiment the first material comprises a titanium alloy and the second material comprises a nickel alloy.

In an exemplary embodiment the process further comprises removing unwanted gases by use of a vacuum on at least one of the first container and the second container subsequent to filling each respective container.

In an exemplary embodiment the process further comprises processing the component precursor and forming a component.

In an exemplary embodiment the component comprises a casing having central portions and outer portions, wherein the central portion comprises a first alloy material and the outer portion comprises a second alloy material.

In an exemplary embodiment the process further comprises forming the component precursor from the combination of the first preform bonded to the second preform in the absence of fasteners and electron beam or other welding processes.

In accordance with the present disclosure, there is provided a turbine engine component precursor comprises a central portion comprising a first preform. A first outer portion comprises a second preform coupled to the central portion. A second outer portion comprises a third preform coupled to the central portion opposite the first outer portion, wherein the first preform comprises a first solid powder metallurgy material and the second and third preforms comprise a second powder metallurgy material bonded together with dynamic compaction.

In an exemplary embodiment the central portion is bonded along an interface with the first outer portion and the central portion is bonded along another interface with the second outer portion.

In an exemplary embodiment the first solid powder metallurgy material and the second solid powder metallurgy material comprise different materials.

In an exemplary embodiment the turbine engine component precursor is further processed into a casing.

In an exemplary embodiment the predefined pattern comprises the first preform stacked in series with the second and third preforms on opposite sides of the first preform.

In an exemplary embodiment the first material comprises a titanium alloy and the second material comprises a nickel alloy.

Other details of the dynamic bonding process are set forth in the following detailed description and the accompanying drawing wherein like reference numerals depict like elements.

DETAILED DESCRIPTION

Figure 1:
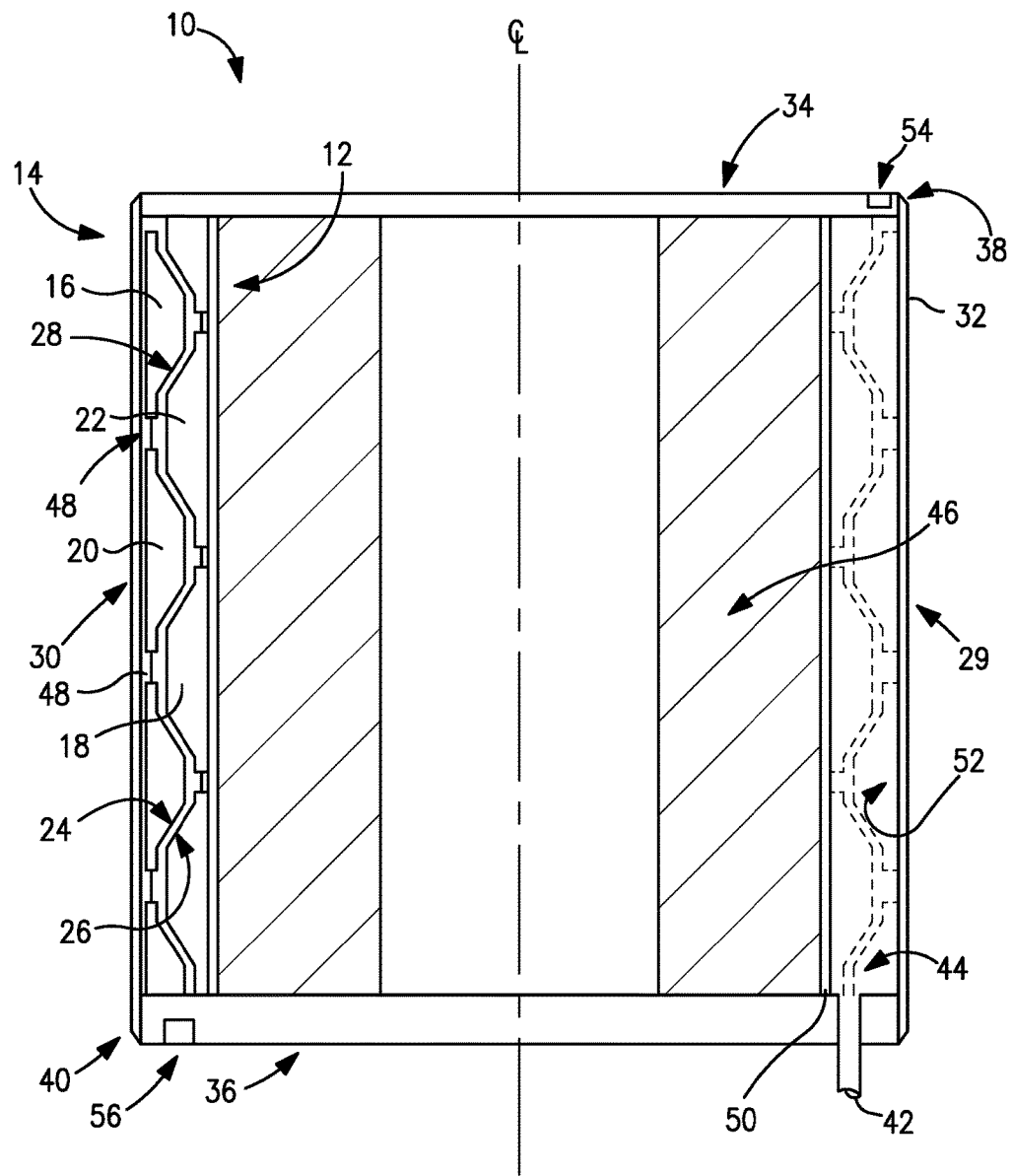
FIG. 1 is a schematic representation in cross-section of powdered material dynamically bonded preforms of dissimilar alloy material prepared for being dynamically bonded.

Referring now to the figures, there is illustrated a turbine engine component precursor 10, such as an annular casing having a centerline CL. It is contemplated that other components can be formed with the process, such as shafts, blades, airseals and the like. The exemplary turbine engine component precursor 10 can have a substantially cylindrical shape about the centerline CL, with an inner portion 12 and an outer portion 14. It is contemplated that other forms and shapes can be created depending on the near net shape form of the component precursor 10.

In one alternative, the component precursor 10 includes a first preform 16 located adjacent a second preform 18. In the exemplary embodiment shown, an alternating pattern of first preform 16 and second preform 18 are employed to cumulatively create the component precursor 10. The preforms 16, 18 are formed in an earlier step by consolidating metal powder into a solid metallurgy material, which in one example can be by dynamic compaction.

In the exemplary embodiment shown, the first preform 16 can be ring shaped and centered on the centerline CL. The second preform 18 can also be ring shaped and centered on the centerline CL.

The turbine engine component precursor 10 may be formed from a titanium-based alloy or nickel based alloy or a composite of alloys formed together to optimize the material properties of each constituent alloy. In an exemplary embodiment, the first preform 16 can comprise a first material 20 composition of titanium alloy or nickel alloy powder such as, Ni—Co—Cr—Al superalloy. The second preform 18 can comprise another, dissimilar, second material/alloy 22 such as a nickel powder alloy such as, Ni—Co—Cr—Ta superalloy. The first material 20 can comprise properties that are best suited for a particular region of the component precursor 10. The second material 22 can comprise properties that are best suited for another region of the component 10. In an exemplary embodiment, depending on the particular use, one of the materials 20, 22 can be of substantially lower cost than the other. The materials 20, 22 can have different characteristics and material properties that are advantageous to the location of the end use, such as on a turbine engine. The first material 20 can be a lower cost alloy and the second material 22 can be a more expensive alloy.

The preforms 16, 18 can be formed by use of dynamic consolidation or compaction of alloy powder metallurgy material(s), such as a nickel alloy powder or other alloy powder materials.

The alloy powder is subjected to dynamic compaction. Dynamic compaction is characterized as momentary application of an extremely high pressure. This is contrasted with the compression characteristic of press-sintered and hot-press methods used in other processes, which are conducted at a much lower pressure and are carried out over an extended period of time. The terms dynamic consolidation and dynamic compaction as well as dynamic bonding can be used interchangeably throughout the description.

Dynamic compaction is best achieved by shock waves produced by, for example, contact with a shaped explosive charge, or by impact with a high-velocity projectile. The shock waves moving through the powder create pressures that are several times the flow stress of the binding metallic phase, typically several GPa (usually about 2 to 7 GPa.). Consolidation occurs by deformation of the powder particles and extrusion into void spaces between the particles. The material at or near the surface of the particle undergoes temperature pulses that range from microseconds to milliseconds, but these are quickly quenched by heat flow into the bulk of the powder particle. Since the heating is extremely short, it cannot support chemical reaction, melting, or other phase formation processes. Thus, it is possible to essentially preserve the original microstructure of the alloy material interface, with little or no chemical reaction or alloying. Thus, the formation of undesirable phases that can compromise the physical properties of the final compacted shape is avoided.

The preforms 16, 18 can be formed into a generally cylindrical shape. It is contemplated that the preforms 16, 18 can be formed into any variety of shapes, some of which are near net shaped geometry. The first preform 16 can include at least one first boundary portion 24 configured to cooperate with the second preform 18 having at least one second boundary portion 26. The first boundary 24 and second boundary 26 can converge to form a common boundary or interface 28. The interface 28 is the location that the two different preforms 16, 18 bond together to become integral or unitary.

In the exemplary embodiment shown, each of the first preform 16 and second preform 18 includes a pair of first boundary portions 24 and second boundary portions 26 respectively to join each preform 16, 18. The preforms 16, 18 can be stacked alternating end-to-end in a series fashion, as shown. In this manner of stacking preforms 16, 18, the first boundary portion 24 of a first preform 16 will share a common boundary or interface 28 with a second boundary portion 26 of a second preform 18 below the first preform 16. Another first boundary portion 24 at an opposite end of the first preform 16 will share another common boundary 28 with another second boundary portion 26 of another second preform 18 to form an additional common boundary, interface 28. This pattern 29 can be repeated along the length L of the component precursor 10.

In an alternative embodiment, the preforms can be stacked in any combination or multiples, for example, two at a time; alternating; a single first preform 16 and then double second preforms 18; two first preforms 16 and a single second preform 18; any combination thereof and the like.

The first boundary portion 24 can have a slanted linear shape to allow for a larger surface area of contact for bonding, provide a shear component in loading, as well as to facilitate sonic inspection of the bonded interface 28 both radially and axially. The slanted linear shape is relative to the centerline CL, thus forming an angle A relative to the centerline CL.

As mentioned above, the preforms 16, 18 can be formed in a prior process step by filling a trapezoidal shaped or more appropriately shaped container with the respective first material alloy 20 powder and second material alloy 22 powder. Excess air/gases can be evacuated from the container. The container is sealed by mechanical means or by welding. The sealed container is then subjected to instantaneous dynamic compaction (i.e., explosion) which applies very high pressure to the exterior surface of the container. The container is collapsed upon the internal powder 20, 22 with the high pressure force to form a solid powder metallurgy billet encased by the container. The container is then removed by conventional machining. In an exemplary embodiment, the preforms 16, 18 can be further processed into a shape desirable for subsequent dynamic compaction/bonding.

In an exemplary embodiment, the preforms 16, 18 can be stacked in alternating fashion as shown in FIG. 1, inside another container 30 of generally right circular cylinder shape. The preforms 16, 18 stacked together can create a predefined pattern 31, shown in FIG. 2. It is contemplated that the shape of the container 30 can be optimized to produce the best bond between the preforms 16, 18 and any predefined pattern 31 that optimizes the common boundary/interface 28.

The first preform 16 can be located in the container 30 along the centerline CL. The second preform 18 can be located in the container 30 adjacent the first preform 16 such that the first preform first boundary portion 24 can be bonded to the second preform second boundary portion 26. In an exemplary embodiment, the first preform 16 can comprise an open cylinder shape. The second preform 18 can comprise an open cylinder shape, wherein the open cylinder shape of the second preform 18 overlaps the cylinder shape of the first preform 16. In an exemplary embodiment, as shown in the figures, the trapezoidal shapes of the preforms 16, 18, allows for overlapping each of the slanted sides of the trapezoidal cross section of the preforms 16, 18. The container 30 also is formed by a hollow cylinder shape canister tube wall 32 with a first cap 34 and a second cap 36 coupled to the edges 38 of the cylinder shaped tube 32 via connections 40, such as welds.

An evacuation tube 42 can be inserted through any end such as the second end 36, allowing communication of materials/gases with a cavity 44 and outside the container 30. In exemplary embodiments, the evacuation tube 42 can facilitate evacuation of the container 30, removing any unwanted gases, such as, gases that may promote oxidation.

A backstop 46 can be inserted into the container 30. The backstop 46 can comprise a rigid inner diameter ring. The backstop 46 can be configured to withstand the forces of the dynamic bonding and thus facilitate the dynamic bonding of the preforms 16, 18. In an alternative embodiment, the backstop 46 can comprise another alloy, similar alloy to at least one of the first alloy 20 and second alloy 22, or a low cost steel material. The backstop 46 can be arranged to be machined away from the bonded preforms 16, 18. In alternative embodiments, the backstop 46 can become an integral part of the component precursor 10.

In an exemplary embodiment, a spacer ring 48 can be employed to align the first preform 16 with the second preform 18 along the length L of the component precursor 10. Additional spacer rings 48 can be deployed along the length L. In exemplary embodiments, dissimilar spacer rings 48 can be utilized, such that the spacer rings 48 comprise a different material than the first preform 16 and in other embodiments different material composition than at least one of the first preform 16 and second preform 18.

The first cap 34, second cap 36 and evacuation tube 42 can be sealed, such that the container 30 filled with the first preform(s) 16 and second preform(s) 18 is sealed from any invasive gases. The container 30 can be sealed by mechanical means or by welding.

In an alternative embodiment, the cavity 44 can include controlled gaps 50. The controlled gaps 50 can be located between the preforms 16, 18 and an inner surface 52 of the canister tube 32. There can be controlled gaps 50 between the backstop 46 and the preforms 16, 18. The controlled gaps 50 facilitate proper dynamic bonding between the first preform 16 and second preform 18 along length L.

In an exemplary embodiment, the caps 34, 36 can include at least one crush zone 54 between the tube 32 and the backstop 46. The crush-zone 54 can be formed as a channel, slot, or other feature of reduced thickness in the cap/end 34, 36. The crush-zone 54 can be formed as a perimeter, or circular shape depending on the shape of the caps 34, 36. The crush zone 54 can include tabs 56 that allow for proper spacing of the preforms 16, 18 but are of negligible size, and thus do not interfere with the bonding. The crush-zone 54 reduces the mechanical strength of the caps 34, 36 and thus the resistance to deformation of the caps 34, 36. The crush-zone minimizes any negative impact the caps 34, 36 may have on the compaction and bonding of the preforms 16, 18.

The container 30 can be removed from the preforms 16, 18 and the newly formed component precursor 10. The backstop 46 can be removed as well.

In another alternative, the component precursor 10 could be formed without the use of preforms 16, 18 (i.e. first material alloy 20 powder and second material alloy 22 powder are dynamically compacted within the container 30). In yet another alternative, the component precursor 10 could be formed by the dynamic compaction of one preform (e.g. preform 16) and one powder (e.g. second material alloy powder 22).

Figure 2:
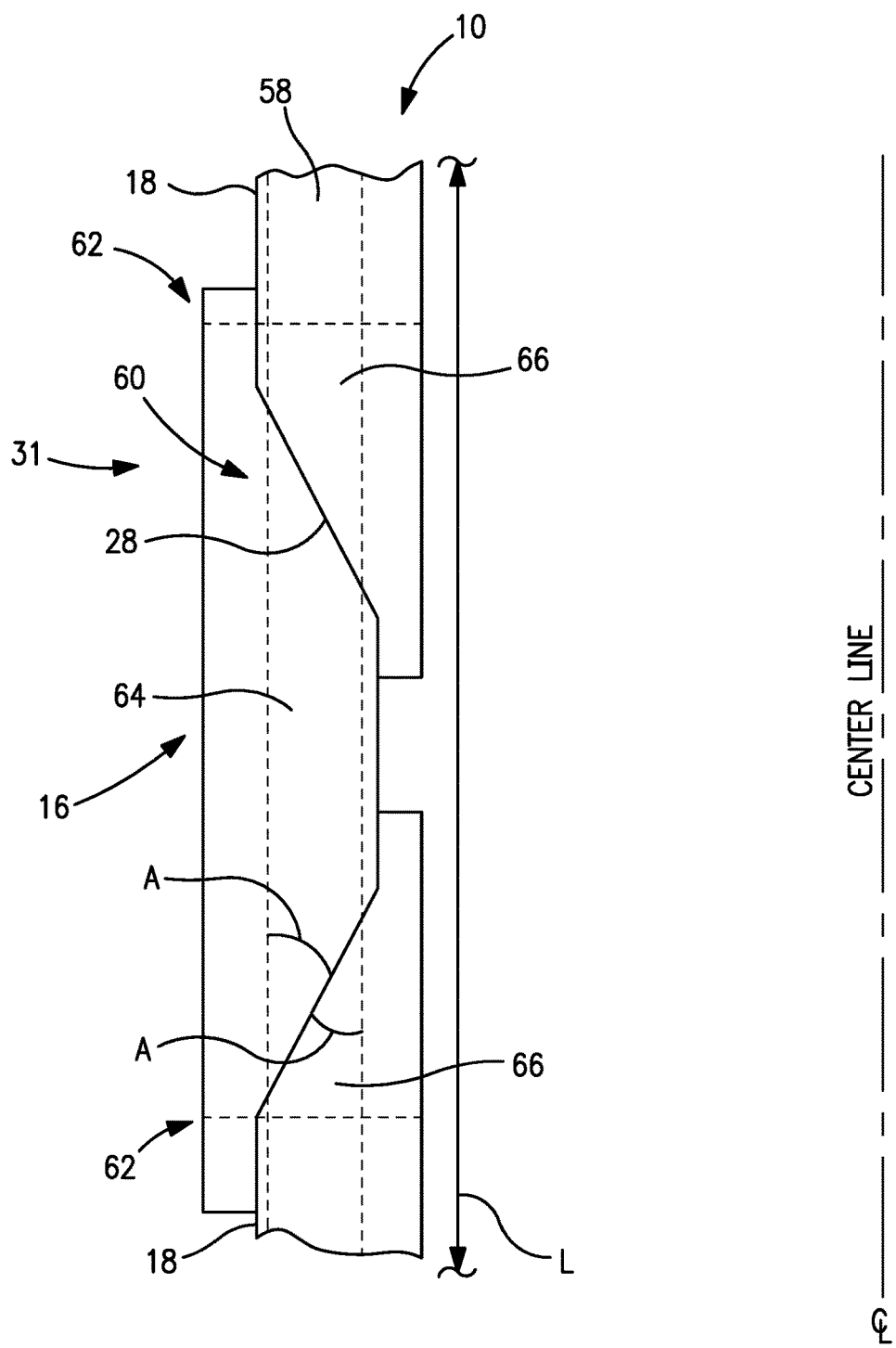
FIG. 2 is a schematic representation of an exemplary embodiment of powdered material dynamically bonded preforms forming a single portion of a turbine engine component precursor.

The newly formed component precursor 10 is now ready for subsequent processing, such as, forging and thermal mechanical processes as required to form the final shape of a component 58, such as shown in dashed lines 60 at FIG. 2.

In an exemplary embodiment, the component precursor 10 can be utilized for high volume production of components 58, such as casings. The component precursor 10 can be cut into wafers/disks as shown by the dashed lines 62. In this form, the casing can have central portions 64 surrounded by outer portions 66. The central portion 64 can comprise the first alloy 20 and the outer portion 66 can comprise the second alloy 22.

By forming the component precursor 10 or component 58 in the above fashion, coupling the component 58 to another component (not shown) without having dissimilar/incompatible material couplings between the component 58 and another component. The dynamic bonding of the first alloy 20 and second alloy 22 allows for a durable and strong bond in the absence of oxidation or other defects between the materials. The use of the above disclosed methods allows for the elimination of conventional fasteners and their inherent weight and adverse material reactions between dissimilar metals.

Figure 3:
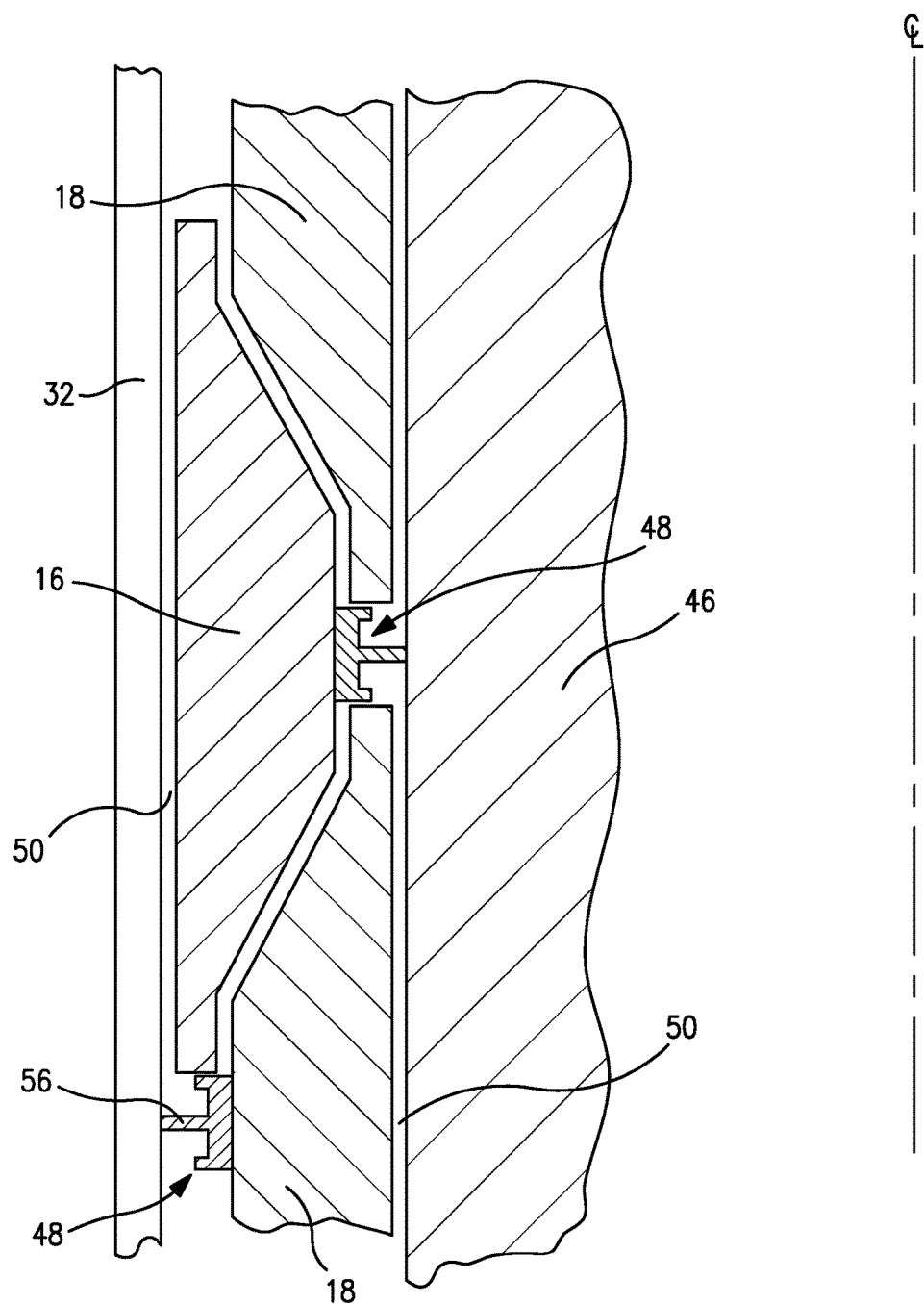
FIG. 3 is a schematic representation of an exemplary embodiment of powdered material dynamically bonded preforms used to form a single portion of a turbine engine component precursor.
Figure 4:
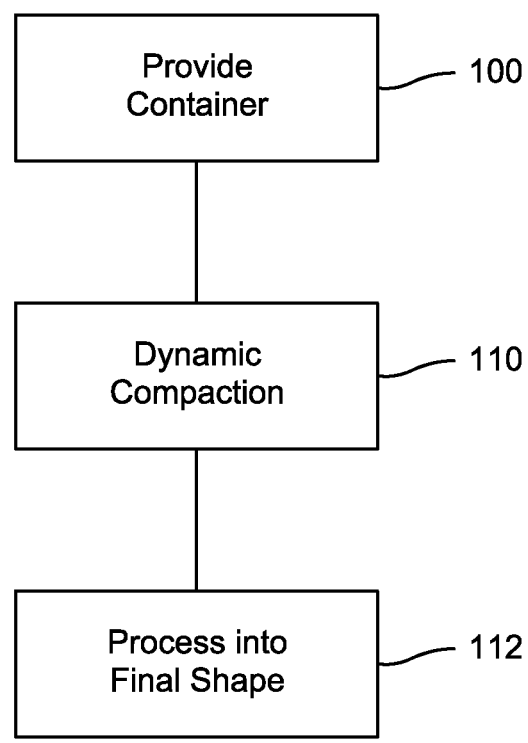
FIG. 4 is a process diagram of an exemplary dynamic compaction process.

FIG. 4 shows an exemplary process embodiment, namely the formation of a powdered material dynamically compacted preform. This exemplary embodiment is similar to the other exemplary embodiments shown in FIG. 1, FIG. 2 and FIG. 3.

The first step includes providing a container 100. The component precursor or preform can be formed by dynamic compaction 110 of a first alloy material for the preform. The preform is then processed into a final shape 112.

Dynamic compaction provides an alternative method for compaction of powder metallurgy material as compared to conventional methods of compaction, such as, hot isostatic pressing or extrusion. The new method allows for the compaction of materials that previously may not have been capable of compaction via previously known methods. Dynamic compaction is achieved without the use of costly hot isostatic pressing or extrusion equipment and their associated facilities. Thus, the turn-around time for dynamic compaction process powder metallurgy material can be months faster that previously known method's wait times for extruded or hot isostatic pressed powder materials. The dynamic bonding techniques disclosed herein allow bonding of similar or dissimilar powder metallurgy material at ambient temperatures with low cost tooling and fixtures. A broader design space can be achieved by use of the disclosed process including hybrid powder metallurgy material combinations and configurations. The disclosed method enables the bonding of dissimilar materials and blend ratios, e.g., ceramic/metallic powders, insitu ceramic/metallic powders, nano insitu ceramic/metallic powders that could not previously be achieved.

There has been provided a dynamic compaction/bonding process. While the dynamic compaction/bonding process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A dynamic compaction process comprising:
    forming a first preform comprising:
    providing a first container, said first container having an interior and an exterior;
    filling said interior of said first container with a first powder material;
    sealing said first container;
    subjecting said exterior of said first container to an instantaneous dynamic compaction, wherein said instantaneous dynamic compaction applies pressure to the exterior of said first container resulting in said first container collapsing upon said first powder material;
    forming a solid powder metallurgy preform encased by said first container; and
    removing said first container from said solid powder metallurgy preform;
    forming a second preform from a second powder material by another dynamic compaction;
    aligning said first preform and said second preform into a predefined pattern in a second container, said second container comprises an interior and an exterior defined by a wall, wherein said predefined pattern comprises an interface;
    placing at least one backstop in said interior of second container adjacent to said first preform and said second preform, wherein said predefined pattern of first preform and second preform is located between said backstop and said wall of said second container;
    sealing said second container;
    subjecting said exterior of said second container to an instantaneous dynamic compaction, wherein said instantaneous dynamic compaction applies pressure to the exterior of said second container resulting in said second container collapsing upon said predefined pattern;
    bonding said first preform to said second preform along said interface;
    removing said second container from said predefined pattern; and
    forming a component precursor.

2. The process according to claim 1, wherein said interface comprises a first boundary portion of said first preform having a common boundary with a second boundary portion of said second preform.

3. The process according to claim 2, wherein said interface is configured to provide at least one of a larger surface area of contact for bonding, a shear component in loading, and facilitate sonic inspection of the bond interface both radially and axially.

4. The process according to claim 1, wherein said first material comprises a titanium alloy and said second material comprises a nickel alloy.

5. The process according to claim 1, further comprising:
    removing unwanted gases by use of a vacuum on at least one of said first container and said second container subsequent to filling each respective container.

6. The process according to claim 1, further comprising:
    processing said component precursor; and
    forming a component.

7. The process according to claim 6, wherein said component comprises a casing having central portions and outer portions, wherein said central portion comprises a first alloy and said outer portion comprises a second alloy material.

8. The process according to claim 1, further comprising:
    forming said component precursor from the combination of said first preform bonded to said second preform in the absence of fasteners and electron beam welding processes.

* * * * *